Patented Feb. 25, 1936

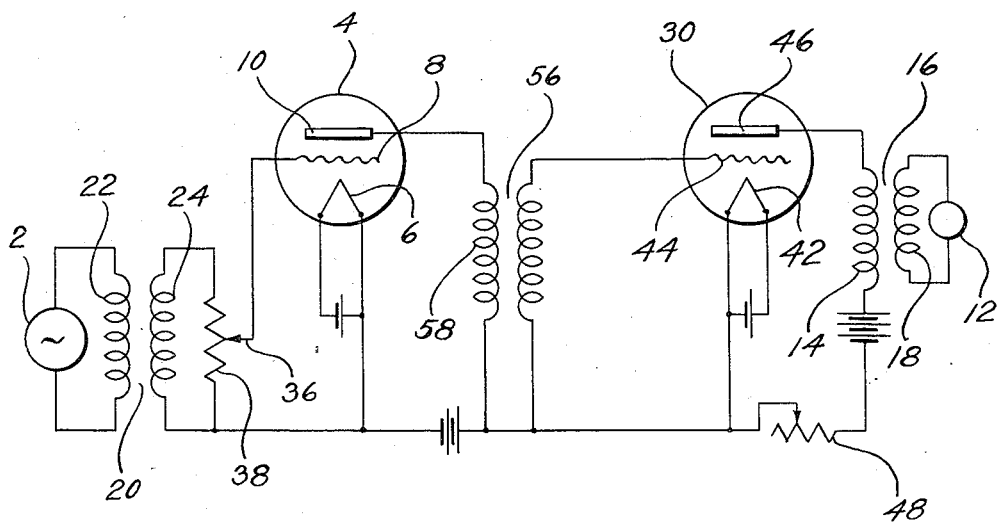

2,031,925

UNITED STATES PATENT OFFICE 2,031,925

METHOD AND MEANS FOR MEASURING DYNAMIC CHARACTERISTICS

Edward Lindley Bowles, Wellesley Farms, Mass.

Original application February 26, 1927, Serial No. 171,238. Divided and this application August 15, 1928, Serial No. 299,696. Renewed May 26, 1934

26 Claims. (Cl. 250—27)

The present invention relates to electric meters. The invention is more particularly concerned with the measurement of the dynamic characteristics, such as the mutual conductance $G_m$ of space-current devices, like vacuum tubes, and other electric instruments. The present application is a division of application Serial No. 171,238, filed February 26, 1927. The said dynamic characteristics, including the mutual conductance $G_m$ of a three-electrode vacuum tube, as is well known, are differential functions of the plate and grid voltages and the plate current of the tube. They are obtainable from the static curves of the appropriate quantities, but very awkwardly and inaccurately, involving manual adjustment of direct-current resistances or other devices and interpretation of incremental variations of current. The mutual conductance is given as the slope of the grid-voltage, plate-current characteristic of a vacuum tube and, therefore, appplies to any region of that characteristic, no matter what the curvature, on the rate of change of the slope. The alternating measuring voltage must necessarily, therefore, be small enough so that the current response resulting from this voltage is proportional to the voltage. Should the voltage be too large, this relationship between cause and effect would not be linear and the response would, therefore, not be a true indication of the desired coefficient. It is a recognized fact, in other words, that, in measuring any dynamic-tube coefficient, the alternating, measuring voltage must be so small that no appreciable harmonics are produced, due to the curvature of the characteristic. These harmonics amount to by-products which vitiate the results sought.

A chief object of the present invention is to provide an improved method of, and apparatus for, measuring, by a simple, direct-indicating scheme, these dynamic characteristics, such as the mutual conductance $G_m$. Other objects will be explained hereinafter, and will be particularly pointed out in the appended claims, it being understood that it is intended to express in the claims all the novelty that the invention may possess.

The invention will be explained in connection with the accompanying drawing, the single figure of which is a diagrammatic view of circuits and apparatus constructed and arranged in accordance with a preferred embodiment of the present invention.

To fix the ideas, let it be assumed that it is desired to measure the mutual conductance of each of a plurality of vacuum tubes 4, having a plurality of electrodes, namely, a filament 6, a grid 8 and a plate 10. Though the description will proceed upon the basis that a particular tube 4 is had in mind, it will also be apparent that any number of such tubes or other devices may be connected in and out of circuit, one after another, for the purposes of measurement.

The tube 4 is connected with a source of alternating voltage 2, either directly or, preferably, through a transformer 20. The primary winding 22 of the transformer 20 is connected in circuit with the source 2, and the secondary winding 24 is connected in the grid or input circuit of the tube 4. The secondary winding 24 is shown shunted by a resistor or voltage divider 38. The output circuit of the tube 4 is coupled to the input circuit of an amplifier 30 having a filament 42, a grid 44 and a plate 46. Several stages of amplification may be employed, if preferred, but the amplifier is common to all the tubes 4 to be tested. The coupling may be effected in any suitable manner, preferably, as shown, through a transformer 56. The input impedance of the primary winding 58 of the transformer 56 should be negligible when compared with the internal plate resistance of the tube 4, in order that, with a constant, impressed voltage for all tubes 4 under test, the current of the output circuit shall be proportional to the amplification coefficient $\mu$ and inversely proportional to the impedance of the output circuit of the tube 4, which impedance is then substantially that of the tube 4 under test, or $r_p$. The deflection of the meter 12 will be proportional to the mutual conductance of the tube 4 and the value of the mutual conductance of different tubes 4 may, therefore, be read directly upon the meter 12.

Current from the output circuit of the tube 4 will be transmitted to the amplifier 30 by the transformer 56, and the alternating voltage thus produced in the plate circuit of the tube 30 will be transmitted through a transformer 16 to an alternating-current indicating instrument 12, such as a galvanometer. The primary winding 14 of the transformer 16 is connected in the output circuit of the amplifier 30 and the secondary winding 18 is connected with the meter 12. If the amplifier 30 be replaced by a detector tube, a direct-current instrument 12 may be inserted, instead, directly in the output circuit of the detector tube 30. In both cases, the mutual conductance or other dynamic characteristic may be read off directly from the instrument, as will be explained.

The mutual conductance may be measured, according to the present invention, in a number of ways. Several ways will be described herein, and others will readily suggest themselves to persons skilled in the art.

It will first be assumed that a definite, constant voltage is impressed upon the input circuits of all tubes 4 under test when they are successively connected with their common input circuit and their common output circuit before described. This may readily be brought about by adjusting the slider 36 to a proper point on the voltage divider 38, which is traversed by a constant current. With the same constant impressed voltage for all tubes 4 under test, the current of the output circuit of the tube 4 will, of course, for practical purposes, be inversely proportional to the total impedance of the circuit, and proportional to the amplification coefficient $\mu$ of the tube. This facilitates reading direct values of the dynamic characteristics upon the alternating-current, indicating instrument 12; for, when different tubes 4, having different dynamic characteristics, are connected into circuit, the meter 12 will indicate the difference of mutual conductance or other dynamic characteristic, if the circuit is properly adjusted, by different connections. As the deflections of the meter 12 will be a constant function of the mutual conductances of different tubes 4, for example, with a current-square meter 12 the deflection will be proportional to the square of the mutual conductance. The values of the mutual conductances of these different tubes 4 may thus be read directly upon the meter 12, as suming the impedances of the common input and output circuits to be substantially constant. With proper calibration of the meter 12, therefore, it is possible to measure an alternating-current or a direct-current impulse independent of the source 2 of voltage and as a direct indication of the dynamic characteristic desired.

Since different tubes of the same type may have mutual conductances or other dynamic characteristics of different value, the use of different tubes 30 will introduce variations in the readings of the meter 12 for the same, constant voltage applied to the tube 4 notwithstanding the use of a common input circuit and a common output circuit for the amplifier or detector tubes 30 with substantially constant impedances in the common amplifier or detector input and output circuits. A variable resistor 48 may, therefore, be inserted in the output circuit of the amplifier 30 to compensate for such differences, and so as to give the same reading in the meter 12, notwithstanding the fact that different amplifiers 30 may be employed.

In the operation of the system, as thus far explained, a calibrated tube 4, having a definite, known, dynamic characteristic, is first inserted in the first stage of the device. As the dynamic characteristics of the amplifier or detector tube 30 are not known, the resistor 48 is adjusted until the indicating meter 12 reads the value of the mutual conductance equal to that of the calibrated tube 4. The device is now ready for the measurement of the dynamic characteristics of various tubes 4, and the meter 12 will indicate such dynamic characteristics directly.

According to the invention disclosed in the said application Serial No. 561,405, however, it is possible to calibrate the device, and thus effect these dynamic-characteristic measurements, even though the first tube 4 is not previously calibrated, so that its dynamic characteristic is not previously known.

The use of a constant impressed voltage in the input circuit of the tube 4 is not, however, essential. In accordance with a second way of measuring the mutual conductance, the voltage divider 38, instead of the meter 12, may be calibrated in terms of the mutual conductance. The position of the slider 36, and not the indicating needle of the meter 12, would then indicate directly the mutual conductance of the tube 4 by adjusting 56 for constant deflection on the meter 12. The calibration of the voltage divider may be effected in many ways without departing from the scope of the invention. Thus, to start with, a calibrated tube 4 having a definite, known mutual conductance (or other dynamic characteristic) could be first inserted in the first stage of the device, and the slide wire 36 could then be adjusted to yield a definite deflection on the meter 12. The position of the slide wire 36 would then indicate the value of the mutual conductance of that particular tube 4. Various known resistances could then be inserted in series with the said known tube 4, and the slide wire 36 adjusted so as always to give the same deflection on the meter 12. These adjusted positions of the slide wire would correspond to calibrations of the voltage divider 38.

To determine the mutual conductance of any unknown tube 4, the latter would be substituted in the circuit for the said known tube 4, the slider 36 would be adjusted until the meter 12 indicated the predetermined deflection. The mutual conductance of the unknown tube 4 would then be read off on the calibrated scale of the voltage divider 38.

It is possible, also, to apply known impressed voltages upon the input circuit of the tube 4 under test, without calibrating the voltage divider 38, for the readings of the meter 12 may be corrected by suitable calculations for such known voltages. In fact, the use of known voltages is sometimes desirable, as both low-amplification and high-amplification tubes may then be measured with the same instrument 12 simply by changing the setting of 36 to the appropriate predetermined point where it may be left for tubes of a given type. In such cases, furthermore, the instrument 12 may be provided with a plurality of differently graduated scales, each corresponding to a particular one of several impressed voltages upon the grid 8.

It is convenient to provide the apparatus with a local power source, such as an oscillator having a frequency of 1000 or 2000 cycles per second. This has two advantages, among others. First, the transformers, chokes and the like may then be more economically designed than when intended for use at 60 cycles; and secondly, the system is then usable even where standard 60-cycle frequencies are not available.

The tube 4 may be conveniently connected in and out of circuit by means of a suitable socket or other receptacle (not shown) that is permanently connected in circuit.

Modifications will readily occur to persons skilled in the art, and all such are intended to be embraced within the appended claims.

What is claimed is:

1. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising maintaining constant, predetermined, alternating-current conditions in one of the circuits of each device, and measuring predetermined alternating-current conditions in the other circuit of the said device.

2. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising impressing an alternating voltage upon the input circuit of each device, and measuring the current in the output circuit of the said device.

3. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising impressing a constant voltage upon the input circuit of each device, amplifying the current of the output circuit of the said device, and measuring the amplified current.

4. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising maintaining the voltage in the output circuit of each device constant, and measuring the voltage in the input circuit of the said device.

5. A method of measuring the mutual conductance of each of a plurality of space-current devices each externally connected so as to have an input circuit and an output circuit, the impedance in the output circuit having a value so low that it is negligible compared with the internal plate resistances of the devices, the said method comprising amplifying the voltage in the output circuit of each device, maintaining the amplified voltage constant, and measuring the voltage in the input circuit of the said device.

6. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for maintaining constant, predetermined, alternating-current conditions in one of the circuits of each device, and means for measuring predetermined alternating-current conditions in the other circuit of the said device.

7. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage upon the input circuit of each device, and means for measuring the current in the output circuit of the said device.

8. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage upon the input circuit of each device, an amplifier for amplifying the current of the output circuit of the said device, and means for measuring the amplified current.

9. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing a constant voltage upon the input circuit of each device, a further space-current device having an input circuit connected with the output circuit of each of the said plurality of space-current devices and having also an output circuit, and means for measuring the current in the output circuit of the further space-current device.

10. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing a constant voltage upon the input circuit of each device, a further space-current device having an input circuit connected with the output circuit of each of the said plurality of space-current devices and having also an output circuit, means for compensating for a dynamic characteristic of the further space-current device, and means for measuring the current in the output circuit of the said further space-current device.

11. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage upon the input circuit of each device, an amplifier having an input circuit connected with the output circuit of the said device and having also an output circuit provided with a variable impedance, and means for measuring the current in the amplifier output circuit.

12. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for maintaining a constant alternating voltage in the output circuit of each device, and means for measuring the voltage in the input circuit of the said device.

13. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing a voltage upon the input circuit of each device, a further space-current device having an input circuit connected with the output circuit of each of the said plurality of space-current devices and having also an output circuit, means for maintaining the voltage of the output circuit of the further space-current device constant, and means for measuring the voltage in the input circuit of the plurality of space-current devices.

14. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a voltage divider in the input circuit, means for adjusting the voltage divider to maintain the voltage in the input circuit of each device constant, and means for measuring the current in the output circuit of the said device.

15. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a voltage divider in the input circuit, means for maintaining the voltage in the output circuit of each device constant, and means for adjusting the voltage divider to measure the voltage in the input circuit of the said device.

16. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage upon the input circuit of each device, a meter connected with the output circuit of the said device, and means for adjusting the voltage impressed upon the input circuit to adjust the indications of the meter.

17. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a transformer having a primary winding adapted to be connected with a source of alternating current and a secondary winding, means for connecting the input circuit of each device with the secondary winding to cause the voltage of the source to become impressed upon the said input circuit, and means for measuring the current in the output circuit of the said device.

18. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a transformer having a primary winding adapted to be connected with a source of alternating current and a secondary winding, means for connecting the input circuit of each device with the secondary winding to cause the voltage of the source to become impressed upon the said input circuit, an amplifier having an input circuit and an ouput circuit, means for connecting the amplifier input circuit with the output circuit of the space-current devices to amplify the current of the output circuit of the space-current devices, and means for measuring the current in the amplifier output circuit.

19. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a transformer having a primary winding adapted to be connected with a source of alternating current and a secondary winding, an adjustable resistor connected with the secondary winding, means for connecting the input circuit of each device with the resistor to cause the voltage of the source to become adjustably impressed upon the said input circuit, means for adjusting the resistor to impress a constant voltage from the source upon the said input circuit, an amplifier having an input circuit and an output circuit, means for connecting the amplifier input circuit with the output circuit of the space-current devices to amplify the current of the output circuit of the space-current devices, and means for measuring the current in the amplifier output circuit.

20. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage from a source of voltage upon the input circuit of each device, and means independent of the source of voltage for measuring the current in the output circuit of the said device as a direct indication of the value of the mutual conductance.

21. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, means for impressing an alternating voltage from a source of voltage upon the input circuit of each device, means for rendering the impressed voltages constant, and means independent of the source of voltage for measuring the current in the output circuit of the said device as a direct indication of the value of the mutual conductance.

22. Apparatus for measuring the mutual conductance of each of a plurality of space-current devices having, in combination, an input circuit, an output circuit, the impedance in the output circuit having a value so low that it is negligible compared with the internal plate resistances of the devices, means for successively connecting the space-current devices with the input circuit and the output circuit, a voltage divider in the input circuit, means for impressing an alternating voltage from a source of voltage upon the voltage divider, means for adjusting the voltage divider to maintain the voltage impressed in the input circuit of each device constant, and means independent of the source of voltage for measuring the current in the output circuit of the said device as a direct indication of the value of the mutual conductance.

23. Apparatus for measuring a dynamic characteristic of each of a plurality of electric devices having, in combination, a common input circuit and a common output circuit with which the electric devices are adapted to be successively connected, the input and the output circuits having substantially constant impedances, means for impressing an alternating voltage upon the electric devices when so connected, a common amplifier having a common input circuit and a common output circuit having substantially constant impedances, means for connecting the amplifier input circuit with the output circuit of the electric devices to amplify the voltage of the output circuit of the electric devices, means for indicating an alternating-current impulse of the amplifier output circuit, and means for varying the impressed alternating voltage to produce a constant indication of the indicating means, the last-named means being calibrated in terms of the dynamic characteristics to be measured.

24. A method of measuring a dynamic characteristic of each of a plurality of space-current devices each having a plurality of electrodes that comprises impressing an alternating voltage between two electrodes of each device, amplifying an alternating-current impulse between two electrodes of the device, varying the impressed alternating-current voltage to render the amplified, alternating-current impulse constant and indicating the alternating impressed voltage in terms of the dynamic characteristic to be measured.

25. Apparatus for measuring a dynamic characteristic of each of a plurality of space-current devices each provided with a plurality of electrodes having, in combination, a common input circuit and a common output circuit with which the electrodes of the space-current devices are adapted to be successively connected, the input and the output circuits having substantially constant impedances, means for impressing an alternating voltage upon the space-current devices when so connected, means for indicating an alternating-current impulse of the output circuit, means for varying the impressed alternating voltage to produce a constant indication of the indicating means, the last-named means being calibrated in terms of the dynamic characteristic to be measured.

26. Apparatus for measuring a dynamic characteristic of each of a plurality of space-current devices each provided with a plurality of electrodes having, in combination, a common input circuit and a common output circuit with which the electrodes of the space-current devices are adapted to be successively connected, the input and the output circuits having substantially constant impedances, means for impressing an alternating voltage upon the space-current devices when so connected, a common amplifier having a common input circuit and a common output circuit having substantially constant impedances, means for connecting the amplifier input circuit with the output circuit of the space-current devices to amplify the voltage of the output circuit of the space-current devices, means for indicating an alternating-current impulse of the amplifier output circuit, means for varying the impressed alternating voltage to produce a constant indication of the indicating means, the last-named means being calibrated in terms of the dynamic characteristic to be measured.

EDWARD L. BOWLES.